United States Patent
Nace et al.

(10) Patent No.: US 6,823,380 B1
(45) Date of Patent: Nov. 23, 2004

(54) SYSTEM AND METHOD PROVIDING CONTINUAL RATE REQUESTS

(75) Inventors: Eric W. Nace, Fairbanks, AR (US); Kestutis Patiejunas, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 673 days.

(21) Appl. No.: 09/633,326

(22) Filed: Aug. 7, 2000

(51) Int. Cl.$^7$ .................. G06F 15/173; G06F 15/16
(52) U.S. Cl. .................. 709/224; 709/203; 709/228
(58) Field of Search ................. 709/203, 224, 709/225, 226, 227, 228, 229, 102, 105, 223

(56) References Cited

U.S. PATENT DOCUMENTS

| | | | | |
|---|---|---|---|---|
| 5,583,792 A | * | 12/1996 | Li et al. ................. | 709/224 |
| 6,012,090 A | * | 1/2000 | Chung et al. ............. | 709/219 |
| 6,078,943 A | * | 6/2000 | Yu ....................... | 709/105 |
| 6,078,960 A | * | 6/2000 | Ballard .................. | 709/229 |
| 6,173,322 B1 | * | 1/2001 | Hu ....................... | 709/224 |
| 6,175,869 B1 | * | 1/2001 | Ahuja et al. ............. | 709/226 |
| 6,314,463 B1 | * | 11/2001 | Abbott et al. ............ | 709/224 |
| 6,330,602 B1 | * | 12/2001 | Law et al. ............... | 709/224 |
| 6,446,120 B1 | * | 9/2002 | Dantressangle ........... | 709/224 |
| 6,526,448 B1 | * | 2/2003 | Blewett .................. | 709/238 |
| 6,571,288 B1 | * | 5/2003 | Sarukkai ................. | 709/226 |

OTHER PUBLICATIONS

G. Banga and P. Druschel, "Measuring the capacity of a web server", In Proc. of USITS, Dec. 1997.*

P. Goyal, H. Vin, and H. Cheng, "Start–time fair queuing: A scheduling algorithm for integrated services packet switching networks", In Proc. of ACM SIGCOMM, pp. 157–168, Aug. 1996.*

G. Banga and P. Druschel, "Measuring the capacity of a web server under realistic loads", World Wide Web, 1999.*

D. Mosberger and T. Jin, "httperf—A Tool for Measuring Web Server Performance", 1998.*

P.Goyal, H.M. Vin, H.Cheng, "Start–time fair queuing: A scheduling algorithm for integrated services packet switching networks", IEEE/ACM Transactions on networking, vol. 5, No. 5, pp. 690–704, Oct. 1997.*

Daniel A. Menasce et al, "Capacity Planning for Web Performance: metrics, models, and methods", Prentice Hall, 1998. chapter 12, p. –264–289.*

Cheng ST (REPRINT), et al.; "Dynamic Quota–Based Admission Control with Sub–Rating in Multimedia Servers", *Multimedia Systems*, vol. 8, No. 2, 2000, p. 83–91.

Kuo–Hsiung Wang, et al.; "A Recursive Method to the Optimal Control of an M/G/1 Queueing System with Finite Capacity and Infinite Capacity", *Applied Mathematical Modelling*, vol. 24, No. 12, p. 899–914.

Wang KH (REPRINT), et al.; "A Queueing System with Queue–Dependent Servers and Finite Capacity", *Applied Mathematical Modelling*, vol. 24, No. 11, 2000, p. 807–814.

* cited by examiner

*Primary Examiner*—William A. Cuchlinski, Jr.
*Assistant Examiner*—Yemane M. Gerezgiher
(74) *Attorney, Agent, or Firm*—Amin & Turocy, LLP

(57) ABSTRACT

A system for determining capacity of a server is provided in accordance with the present invention. The system may include a client for generating a plurality of requests to the server, the client providing a desired rate of requests by calculating an actual rate of requests being generated and adjusting the actual rate to within a predetermined range of the desired rate such that a continual rate of requests are provided to the server in order to facilitate determining server capacity.

21 Claims, 7 Drawing Sheets

SYSTEM AND METHOD PROVIDING CONTINUAL RATE REQUESTS

TECHNICAL FIELD

The present invention relates generally to computer systems, and more particularly to a system and method for providing a consistent server load wherein the load may be adjusted and controlled in order to determine server capacity—thereby facilitating server performance testing and capacity planning.

BACKGROUND OF THE INVENTION

With the rise of Internet and other related technologies, system requirements for servicing ever increasing network traffic have dramatically changed. Ever more powerful server systems, which are often configured as an array of servers, are often provided to service requests originating from external sources such as the World Wide Web, for example. As local Intranet systems have become more sophisticated thereby requiring servicing of larger network loads and related applications, internal system demands have grown accordingly as well. Unfortunately, as demands for more complicated and higher performance systems have increased, conventional tools and/or methods for measuring, predicting, and planning whether a given server is capable of servicing a desired network load have not been adequate.

Presently, many performance measurement systems rely on a connection model in order to determine whether a server may have the requisite capacity to service a desired network load. According to the connection model, a plurality of client systems may be configured to generate a large number of concurrent connections. However, this type of model may not adequately stress a given server and/or application and is thus inadequate for a number of reasons. One such problem is the connection model does not provide a controllable amount of stress for the server. Since each client operates independently, a suitable mechanism, for example, would be needed to coordinate the various load requests. Unfortunately, such mechanisms are presently unavailable. Another problem relates to providing a sustained and/or predictable rate of requests. Generally, since clients are generating load requests open loop (e.g., without monitoring the number of requests), peaks and valleys of requests are likely to occur. Therefore, clients may likely wait while outstanding connections remain open wherein a given server may not be stressed to its fullest capacity. Thus, performance measurements based on an inconsistent load are difficult to determine.

Still another problem associated with conventional systems relates to adjusting desired loads. Currently, in order to increase the number of load requests, an additional client system may have to be installed to provide additional connections. Consequently, costs are increased and resulting granular adjustment of combined server load difficult to attain. Still, conventional systems that provide loosely coupled/controlled and/or unregulated output stream of requests do not enable accurate predictions to be made as to whether an application and/or system may operate at a desired capacity or stress level. In view of the above problems, there is an unsolved need for a system and/or methodology to generate a consistent network load, provide a more realistic load model, and thereby improve server performance testing to achieve improved capacity planning.

SUMMARY OF THE INVENTION

The present invention relates to a system and method to provide a predictable and user definable load/tool for stressing and/or testing a server's performance. In accordance with the present invention, a user may define/specify a control rate (e.g., requests per second) for a continual stream of requests (e.g., HTTP requests) to be sent from a client to a web server, for example. In this manner, a consistent and predictable load may be established for the server in order to determine if a given server may have the capacity to process the desired load. By establishing a predetermined load at a consistent rate for the server, a user may determine: whether particular code and/or applications operate under load, whether any negative results are produced from the load, whether breaking points are produced from excessive load, and/or whether new applications and/or hardware have the capacity to serve the desired load.

More specifically, the present invention provides a queuing architecture to store and retrieve data—in the form of HTTP requests, in a rapid manner. The architecture may provide a queue for processing the requests, a component for sending/receiving the requests, and a feedback loop for controlling the desired rate of the requests, and a scheduler for determining a continual rate of requests for an upcoming period of time, for example. Data items designated for the queue may be sorted according to a predetermined criteria (e.g., time to execute the request) and inserted into the queue such that the queue may remain time sorted. As will be described in more detail below, the scheduler may be provided to enable scheduling of requests and interfacing to the component. The component may then send/receive requests by managing threads via the scheduler (e.g., scheduling API (Application Program Interface) to enable when the requests are actually sent to the server. The feedback loop may reside in a separate thread and may be responsible for calculating requests per second being generated and thus supply the scheduler with information for increasing and/or decreasing the rate of requests.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
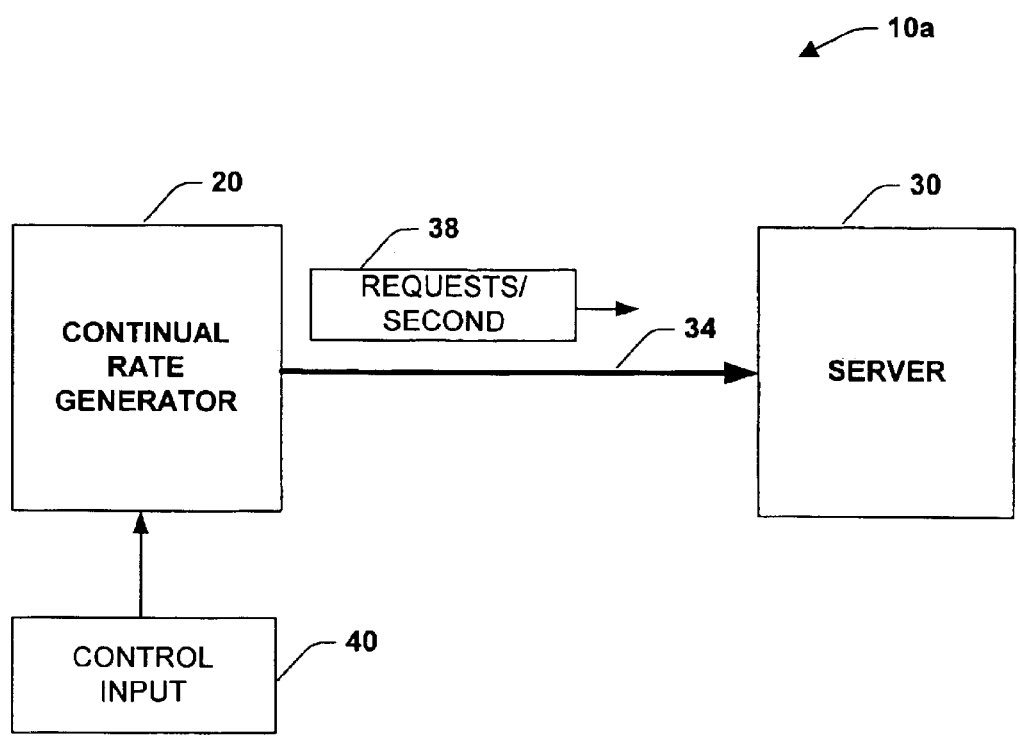
FIG. 1 is a schematic block diagram illustrating a continual rate generating system in accordance with an aspect of the present invention.

The present invention is now described with reference to the drawings, wherein like reference numerals are used to refer to like elements throughout.

The present invention relates to a system and methodology for generating a continual rate of requests in order to provide a consistent and user adjustable network load. In contrast to conventional systems wherein a network load may be based on a concurrent connection model, the present invention generates server requests based upon actual requests per second. In this manner, capacity planning, stress testing and system predictions may be determined more accurately, efficiently and at a lower cost than conventional systems. As will be described in more detail below, the present invention may provide continual rate requests based upon a closed loop system wherein feedback is employed within the framework of a queuing architecture to control a desired network load.

Referring initially to FIG. 1, an exemplary system 10a illustrates an aspect of a continual rate generation system in accordance with the present invention. A continual rate generator 20 (e.g., client system adapted with the present invention) may be operatively coupled to a server 30 via a network 34. As illustrated, a continual rate of network requests/second 38 may be generated to provide a desired load for the server 30. In contrast to conventional systems, the network requests are determined from a desired rate of requests wherein output from the generator 20 may b determined as the number of requests per second, for example. The requests may be of HTTP data format and it is to be appreciated that other well-known request data formats may be selected. It has been found that providing a desired rate for network requests more accurately describes an actual system 10a network load than conventional concurrent connection models. In this manner, the server 30 and related applications may be realistically and more reliably tested and stressed to determine a desired capacity. A control input 40 may be provided to enable a user to select a desired rate (e.g., amount of requests/second 38). The control input 40 may be provided as input (e.g., a number indicating a desired requests/second) from the network 34 and/or may be manually input via a user interface (not shown) on the continual rate generator 20. By enabling users to adjust the request/second output 38, incremental stress testing may be achieved to enable determinations and predictions as to how much load and/or capacity may be suitably administered by the server 30. In this manner, precise determinations may be made regarding system 10a reliability and performance without adding additional generators 20. Thus, costs are mitigated over conventional systems.

Figure 2:
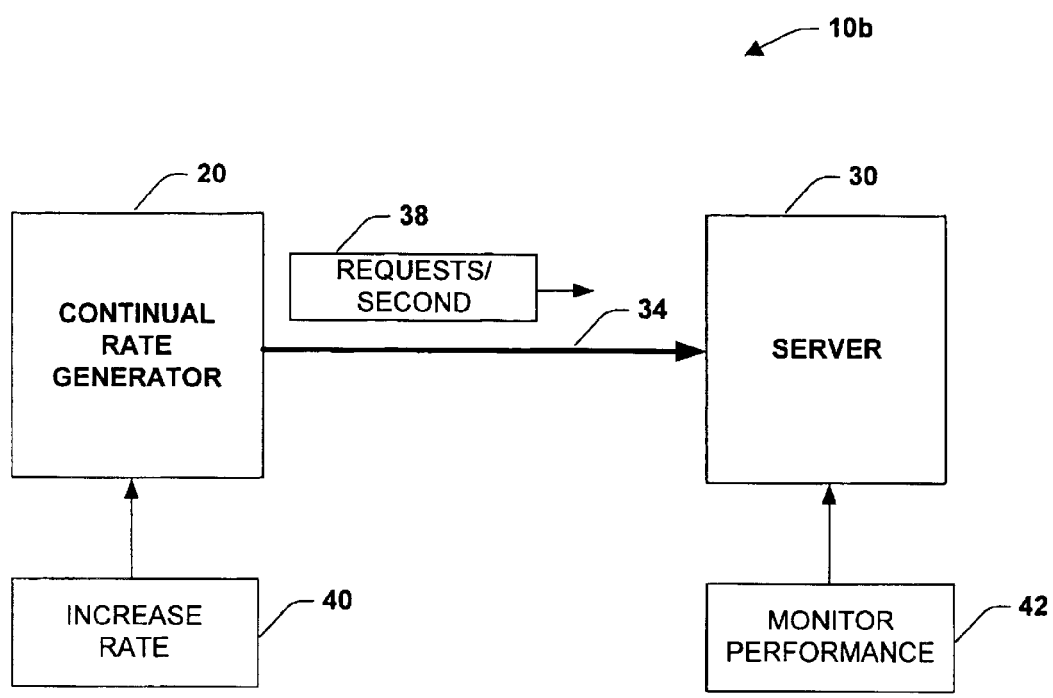
FIG. 2 is a schematic block diagram illustrating a capacity planning/performance testing system in accordance with an aspect of the present invention.

Turning now to FIG. 2, a capacity planning and prediction system 10b illustrates an aspect of the present invention. For example the control input 40 may be adjusted to increase the requests per second 38 to a larger rate (e.g., 100 requests/second to 200 requests/second). A user interface 42 (e.g., Windows operating system interface) may be provided to monitor performance (e.g., Windows Perfmon counter) relating to the server's 30 performance. The counters may be configured with by a plurality of related system metrics such as providing statistics on CPU bandwidth of the server 30 and memory availability, for example. By monitoring performance of the server 30 as the rate of requests 38 are increased, load capacity for the server 30 may be determined. Alternatively, the requests per second 38 may be increased until it is determined that the server 30 can no longer respond to the additional load (e.g., additional requests no longer serviced). In this manner, capacity may be determined as the maximum number of requests per second which may be serviced.

By employing the request per second (RPS) model 38, as opposed to conventional concurrent connection models, users are enabled to place a controllable amount of stress on a given application and/or piece of code. This is advantageous in determining whether the application may service the desired load. By providing a sustained rate of requests 38, variability relating to inconsistent load generators associated with conventional systems is mitigated. If the number of requests sent to the server 30 is inconsistent, it is difficult to determine if stress indicators on the server 30 are due to server performance or due to spikes generated by inconsistent load requests. By utilizing a consistent rate, administrators may monitor counters on the server to determine application performance without variability introduced from the load. By increasing the RPS 38, administrators may efficiently and accurately increase the rate of requests over time—in a controlled manner, to determine where an application or server begins to break down thus, reducing the quality of the server 30. As described above, the RPS 38 enables an administrator to determine capacity for the server 30. By monitoring metrics such as performance counters described above, administrators may make predictions on additional capacity requirements—if any. For example, an administrator may adjust the RPS 38 to be at about 100 which may approximate an actual network load. A new application may be required to run on the server 30 wherein the expected rate of requests may increase to 120, for example. By adjusting the RPS 38 to 120, the administrator may predict whether or not the new application can service the increased rate. In this manner, administrators may determine whether additional hardware and/or performance may be necessary at the server 30 to service the desired load.

Figure 3:
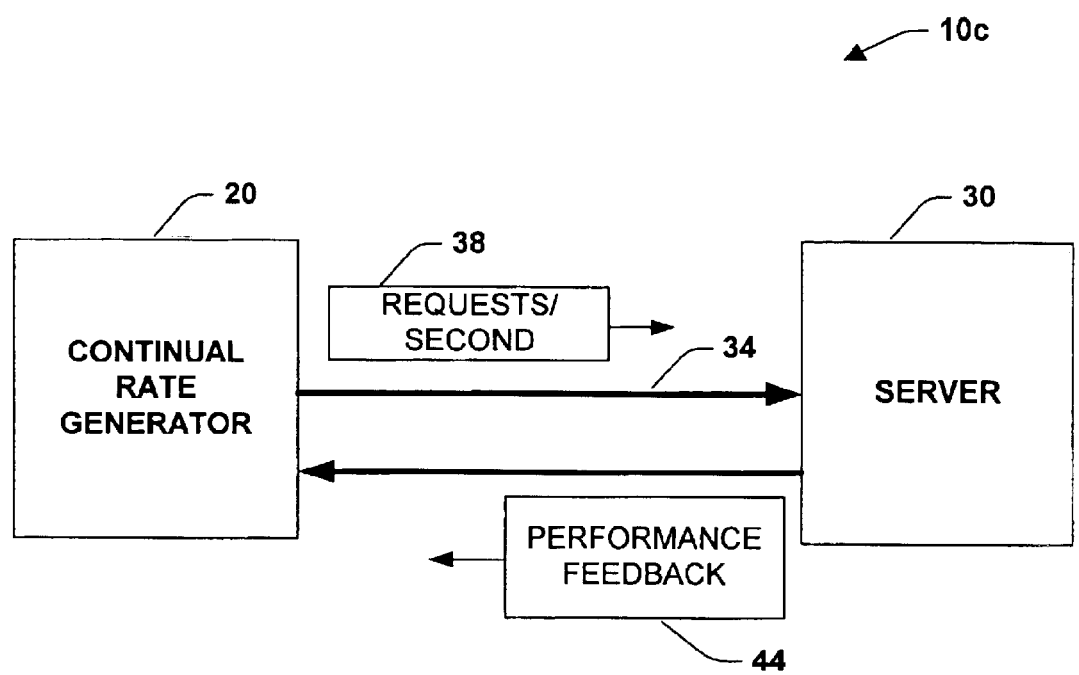
FIG. 3 is a schematic block diagram illustrating an alternative capacity planning system in accordance with an aspect of the present invention.

Referring now to FIG. 3, a system 10c illustrates an automated capacity planning system in accordance with an aspect of the present invention. Rather than provide manual input 40, the continual rate generator 20 may be adapted to generate an ever increasing amount of requests per second 38. According to one aspect of the present invention the server 30 may be adapted to send performance feedback 44 such as the counters described above. Alternatively, the continual rate generator 20 may be adapted to read the performance feedback 44 from log files (not shown) within the server 30. As the requests per second 38 are increased by the generator 20, capacity may be determined by comparing the performance feedback 44 with predetermined thresholds. For example, a threshold capacity may be established that server CPU utilization should remain below 70%. The continual rate generator 20 may then increase the requests per second 38 until the desired threshold has been attained. At the point wherein the threshold has been exceeded, the actual rate of requests per second 38 which caused the threshold to be exceeded may be utilized to indicate the capacity for the system 10c. It is to be appreciated that other rules and/or thresholds may be applied to determine capacity.

Figure 4:
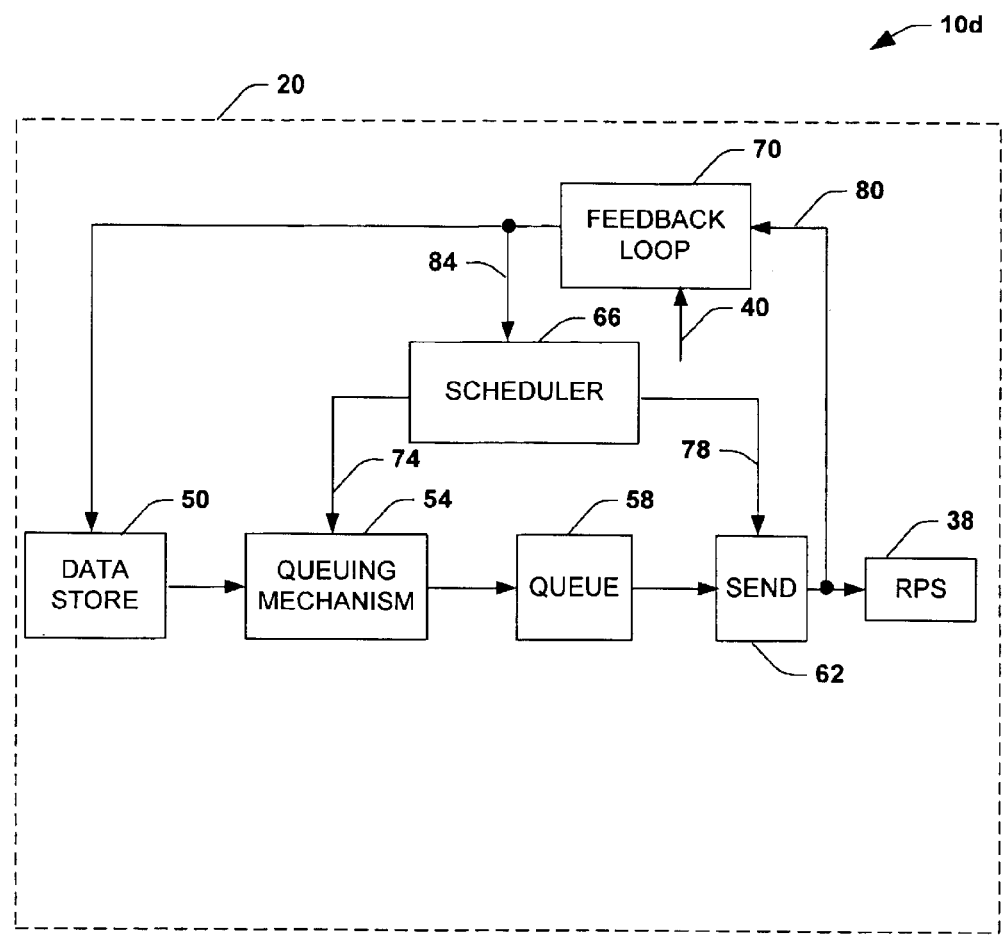
FIG. 4 is a schematic block diagram illustrating an exemplary architecture providing controlled request per second output in accordance with an aspect of the present invention.

Referring now to FIG. 4, an exemplary system 10d illustrates an architecture for a continual rate generator 20 in accordance with an aspect of the present invention. The system 10d provides an adjustable RPS 38 as described above wherein stress testing, failure predictions and capacity planning may be determined. The system 10d may include a data store 50, a queuing mechanism 54, a queue 58, a component 62 for sending requests, a scheduler 66 and a feed back loop 70. The data store 50 may include data in the form of HTTP requests to be sent to the server 30. As described above, other data formats may be included within the data store 50.

The queuing mechanism 54 retrieves data from the data store 50 based upon a store input 74 from the scheduler 66. The queuing mechanism 54 may be implemented via a standard queuing algorithm, for example, which is well understood. HTTP requests may be placed into the queue 58 by the queuing mechanism 54 when the scheduler enables the input 74. Sorting requests within the queue 58 may be provided by the queuing mechanism 54 according to a criteria—time to execute, for example. Based upon a send input 78 from the scheduler 66, the component 62 reads the sorted requests from the queue 58 and sends the requests based upon a rate determined by the scheduler 66. In this manner, the RPS 38 may be provided.

The feedback loop 70 provides closed loop control to enable the system 10*d* to provide a continual and sustained rate of requests 38. A target RPS input 40, as described above, may be provided to the feedback loop 70 along with an actual RPS input 80. By subtracting the actual RPS from the target RPS or vis versa, the feedback loop 70 may provide an error input 84 to the scheduler 66 and/or the data store 50 in order to control the RPS 38. Based upon the error input 84, the scheduler or the data store 50 may attempt to increase and/or decrease the RPS 38 to adjust the rate via inputs 74 and 78 according to the target RPS 40. According to one aspect of the present invention, the system 10*d* described above may be provided within a client computer system (not shown). It may be desirable to execute the above-described portions of the system 10*d* within separate execution threads within the client computer to facilitate optimum performance. It is to be appreciated however, that the all or some of the system 10*d* portions may be executed within one or more threads, executables, and/or objects, for example.

The following exemplary code fragment describes portions of the system 10*d* illustrated in FIG. 4 such as the scheduler 66 and feedback loop 70. It is to be appreciated that other programming languages (e.g., visual basic, JAVA, assembler, etc.) and/or steps may be employed to provide the above-described portions of the system 10*d*.

```
a) WaitTime = may be about 1 second, may be recalculated in loop.
b) DefaultPeriod = may be about 1 second for the general case, may be adjusted to
                   another value by an administrator.
c) WaitTime = MEMORYSIZE_FOR_RPS_ALG/SIZE_OF_ONEREQUEST
   /MAX_REQUESTED_RPS/SMOOTHNESS_FACTORDefaultHalfPeriod =
   DefaultPeriod/2.
d) T_START_TIME = GetCurrentTimeInMillisSeconds ( )
e) while(TEST_NOT_COMPLETE)
   {
f)     Sleep(WaitTime)
       //to mitigate spiking, schedule for a half time period in the future
g)     T1 = GetCurrentTimeInMilliSeconds ( ) + DefaultHalfPeriod;
h)     T2 = T1;
i)     NUMBER_REQUESTS_SENT_THIS_PERIOD = 0;
j)     while (NUMBER_REQUESTS_SENT_THIS_PERIOD < Target RPS AND
k)            (T1 + DefaultHalfPeriod - T2 > 0))
              {
l)            Request = GetRequestDataFromStorage ( );
m)            T2 = GetCurrentTimeInMilliseconds ( );
n)            If (Request == NULL)
              {
                   //give time for data to be placed in storage structure
o)                 Sleep (SOME_TIME_PERIOD);
                   //try to get another request
p)                 continue;
              }
q)     ScheduleRequestSendTime (Request, T1 + DefaultHalfPeriod +
           (NUMBER_REQUESTS_SENT_THIS_PERIOD * 1000/TargetRPS));
           //add one to the counters
r)            NUMBER_REQUESTS_SENT_THIS_PERIOD ++;
s)            TOTAL_REQUESTS_SENT ++;
       }
t) T2 = GetCurrentTimeInMilliseconds( );
//compute the actual RPS, value used by feedback looping mechanism
//time may be in milliseconds, normalize total sent requests
u) ACTUAL_RPS = (1000*TOTAL_REQUESTS_SENT)/(T2 +1 -
       T_START_TIME);
//determine how long we can sleep before the next period begins
v) T1 = (T1 + DefaultHalfPeriod);
w) If (T1<T2)
   {
x)     T1 = T2;
   }
y) WaitTime = T1 - T2;
}
```

The following description will now reference the code fragment illustrated above in reference to line numbers a) through z) above. At line a), a wait time period may be defined to provide a compensation period for the scheduler 66. At line b), a default period may be defined to determine the period over which requests are to be generated. As will be described in more detail below, the scheduler 66 may run in a separate thread and periodically activate to generate requests for an upcoming period of time. At line c), wait time may be adjusted more precisely according to an exemplary time computation. At line d), a start time for the next period may be acquired by reading the current system clock, for example.

At line e), the main body of the scheduling thread may execute while a test not complete flag has not been set. At line f), the thread may sleep for the period of wait time described above to provide a smooth supply of requests and mitigate spiking. At line g), a period start may be defined as T1 plus the default half period (e.g., Default period/24). At line h), a second period marker T2 may be initialized to the period start T1. At line i) the number of requests sent for the current period are initialized to zero before entering the main RPS loop. At line j), a while loop may be configured to enable requests to continue to be generated as long as the rate is below the target RPS described above. According to the code described in this example, line k) enables the loop to exit so the actual RPS may be calculated and provided for feedback. At line l) a request is read from the queue 58. At line m), the period marker may be updated with the current time. At lines n) through p), a wait period may be optionally included to allocate more time for the queuing mechanism 54 described above to provide data to the queue 58.

At line q), the scheduler 66 schedules request send time. At line r) and s), the number of requests sent in the current period and total requests sent variables are updated. At line t), the period marker T2 is updated to indicate the current time. In line u), an actual RPS computation may be computed and provided to the feedback loop 70 described above. At lines v) though y), time adjustments for the next time period are determined.

Figure 5:
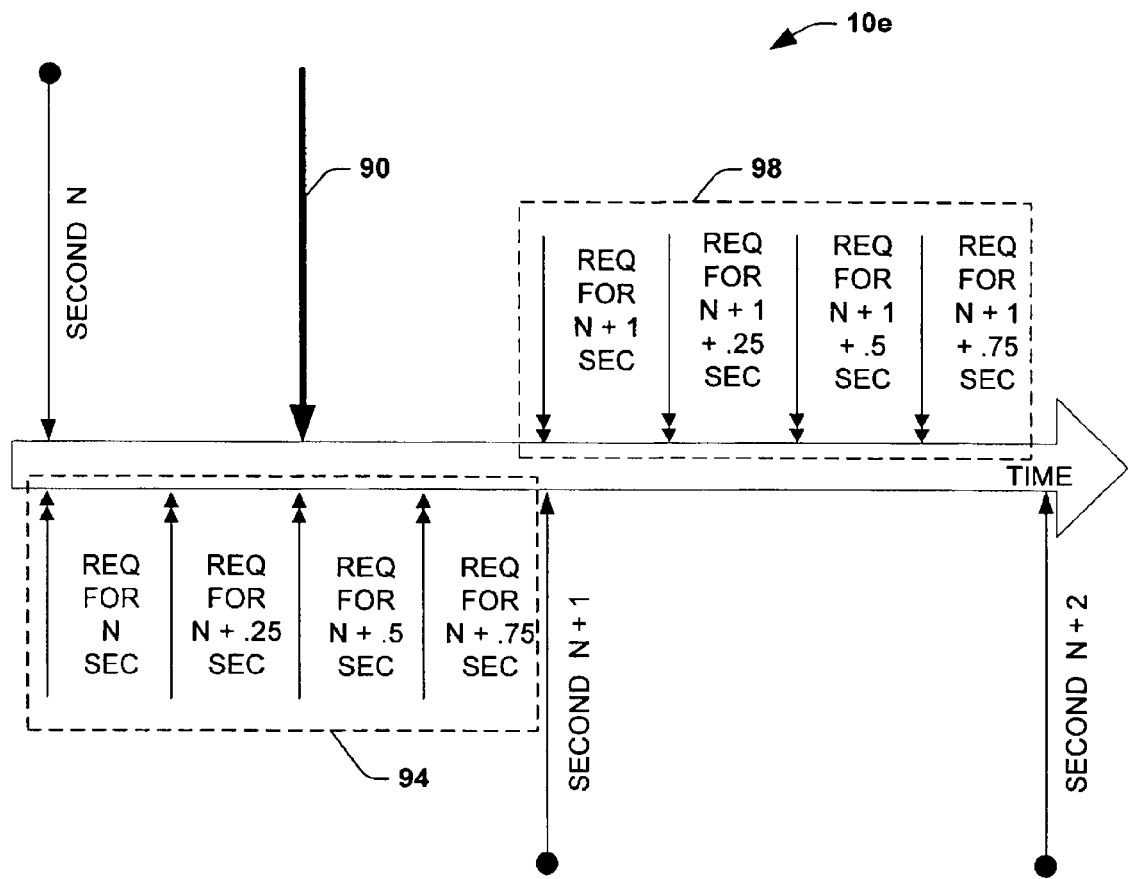
FIG. 5 is a timing diagram illustrating an aspect of the present invention.

Turning now to FIG. 5, a timing diagram illustrates an exemplary request output structure 10e in accordance with the scheduler 66 described above. As depicted by the structure 10e, the scheduler 66 may activate at reference numeral 90 in the middle of a current period N (N being an integer) (reference numeral 94) to provide requests to the component 62 for the next period N+1 (reference numeral 98). In this manner, the scheduler 66 enables a continual and smooth supply of requests to be provided to the component 62 at a sustained rate for the upcoming period N+1. During the current period N, requests are thus scheduled for a desired rate for the upcoming period N+1 based upon the feedback loop 70 described above wherein the target RPS and the actual RPS are compared to determine whether the desired rate has been achieved. If the desired rate has not been achieved, the requests generated for the next period may be increased. If the desired rate has been achieved, a similar number of requests may be generated as were provided in the previous period.

Figure 6:
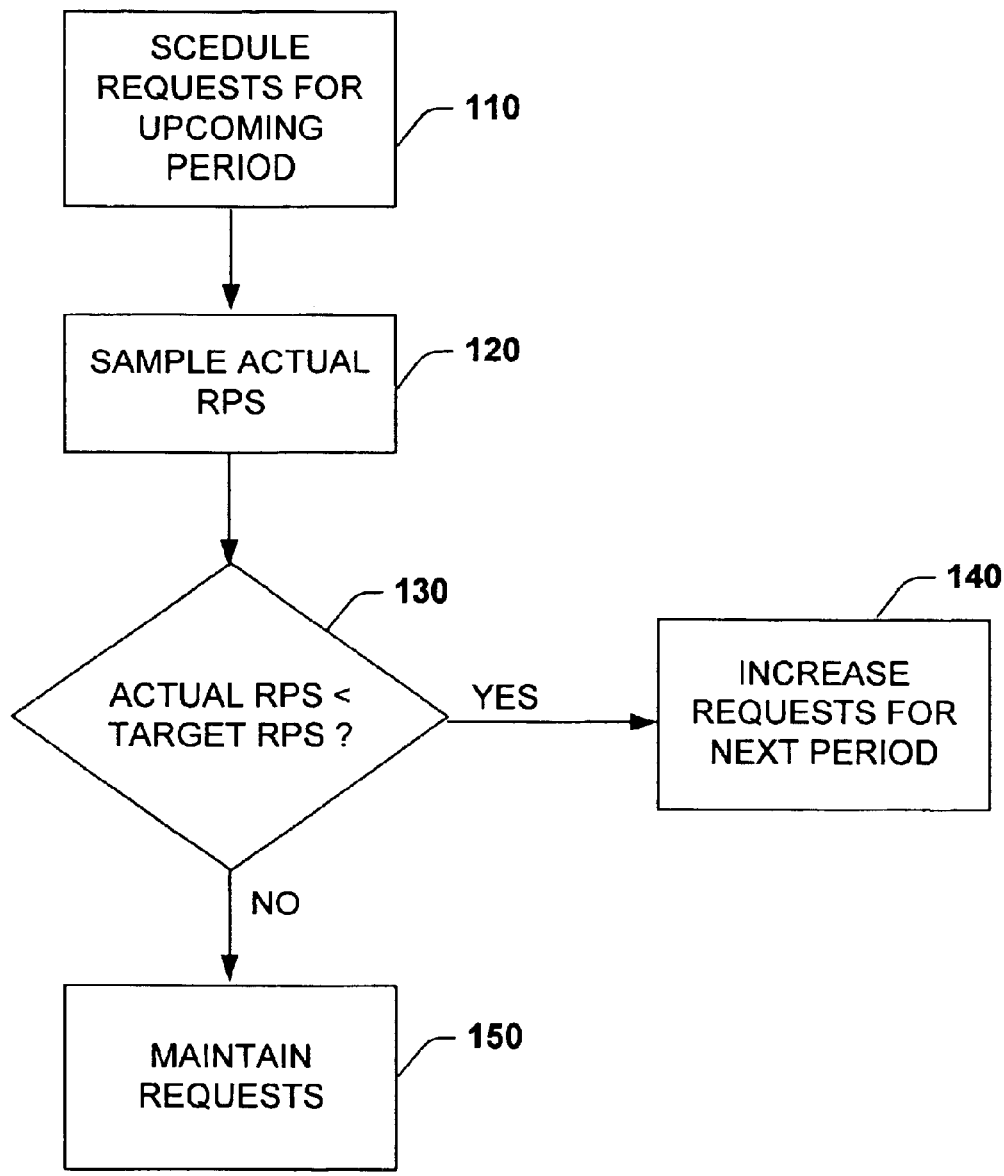
FIG. 6 is a flow chart diagram illustrating a methodology for providing continual rate output in accordance with an aspect of the present invention.

Referring now to FIG. 6, a flow chart diagram illustrates a methodology for providing continual rate requests in accordance with an aspect of the present invention. At step 110, requests are scheduled for the upcoming time period as described above. At step 120, the actual requests per second provided by the generator are sampled. At step 130, a determination is made as to whether the actual RPS is less than the target RPS. For example, the actual RPS may be subtracted from the target RPS as described above. If the actual RPS is less than the target RPS at step 130, the process proceeds to step 140 and proceeds to increase the number of requests for the next period. If the actual RPS is equal to the target RPS, the process proceeds to step 150 and maintains a similar number requests as the prior period. Although not shown, it is to be appreciated that if the actual RPS is above the target RPS, that the requests generated for the next period may be reduced.

Figure 7:
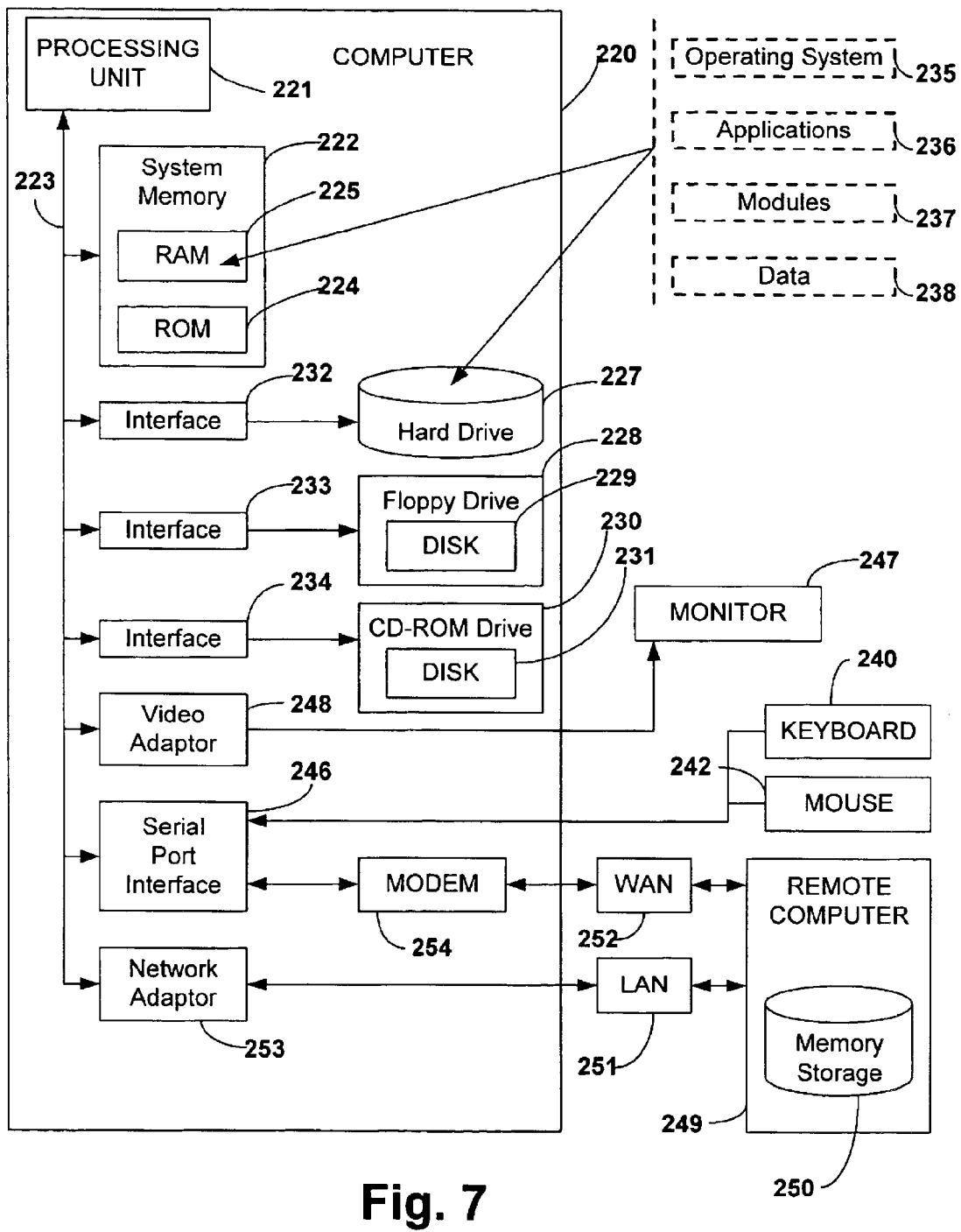
FIG. 7 is a schematic block diagram illustrating a system in accordance with an aspect of the present invention.

In order to provide a context for the various aspects of the invention, FIG. 7 and the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program module. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 7, an exemplary system for implementing the various aspects of the invention includes a conventional computer 220, including a processing unit. 221, a system memory 222, and a system bus 223 that couples various system components including the system memory to the processing unit 221. The processing unit may be any of various commercially available processors, including but not limited to Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also may be employed as the processing unit 221.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 224 and random access memory (RAM) 225. A basic input/output system (BIOS), containing the basic routines that help to transfer information between elements within the server computer 220, such as during start-up, is stored in ROM 224.

The computer 220 further includes a hard disk drive 227, a magnetic disk drive 228, e.g., to read from or write to a removable disk 229, and an optical disk drive 230, e.g., for reading a CD-ROM disk 231 or to read from or write to other optical media. The hard disk drive 227, magnetic disk drive 228, and optical disk drive 230 are connected to the system bus 223 by a hard disk drive interface 232, magnetic disk drive interface 233, and an optical drive interface 234, respectively. The drives and their associated computer-readable media provide nonvolatile storage of data, data structures, computer-executable instructions, etc. for the server computer 220. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 225, including an operating system 235, one or more application programs 236, other program modules 237, and program data 238. The operating system 235 in the illustrated computer may be a Microsoft operating system (e.g., Windows NT operating system). It is to be appreciated that other operating systems may be employed such as UNIX, for example.

A user may enter commands and information into the server computer 220 through a keyboard 240 and a pointing device, such as a mouse 242. Other input devices (not shown) may include a microphone, a joystick, a game pad, a satellite dish, a scanner, or the like. These and other input devices are often connected to the processing unit 221 through a serial port interface 246 that is coupled to the system bus, but may be connected by other interfaces, such as a parallel port, a game port or a universal serial bus (USB). A monitor 247 or other type of display device is also connected to the system bus 223 via an interface, such as a video adapter 248. In addition to the monitor, computers typically include other peripheral output devices (not shown), such as speakers and printers.

The computer 220 may operate in a networked environment using logical connections to one or more remote computers, such as a remote client computer 249. The remote computer 249 may be a workstation, a server computer, a router, a peer device or other common network node, and typically includes many or all of the elements described relative to the server computer 220, although only a memory storage device 250 is illustrated in FIG. 7. The logical connections depicted in FIG. 7 may include a local area network (LAN) 251 and a wide area network (WAN) 252. Such networking environments are commonplace in offices, enterprise-wide computer networks, intranets and the Internet.

When employed in a LAN networking environment, the server computer 220 may be connected to the local network 251 through a network interface or adapter 253. When utilized in a WAN networking environment, the server computer 220 generally may include a modem 254, and/or is connected to a communications server on the LAN, and/or has other means for establishing communications over the wide area network 252, such as the Internet. The modem 254, which may be internal or external, may be connected to the system bus 223 via the serial port interface 246. In a networked environment, program modules depicted relative to the computer 220, or portions thereof, may be stored in the remote memory storage device. It will be appreciated that the network connections shown are exemplary and other means of establishing a communications link between the computers may be employed.

In accordance with the practices of persons skilled in the art of computer programming, the present invention has been described with reference to acts and symbolic representations of operations that are performed by a computer, such as the computer 220, unless otherwise indicated. Such acts and operations are sometimes referred to as being computer-executed. It will be appreciated that the acts and symbolically represented operations include the manipulation by the processing unit 221 of electrical signals representing data bits which causes a resulting transformation or reduction of the electrical signal representation, and the maintenance of data bits at memory locations in the memory system (including the system memory 222, hard drive 227, floppy disks 229, and CD-ROM 231) to thereby reconfigure or otherwise alter the computer system's operation, as well as other processing of signals. The memory locations wherein such data bits are maintained are physical locations that have particular electrical, magnetic, or optical properties corresponding to the data bits.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system for determining capacity of a server, comprising:
a client for generating a plurality of requests to the server, the client providing a desired rate of requests by calculating an actual rate of requests being generated and adjusting the actual rate to within a predetermined range of the desired rate such that a continual rate of requests are provided to the server in order to facilitate determining server capacity.

2. The system of claim 1 further including a control input for adjusting the desired rate of requests.

3. The system of claim 2 wherein the control input provides the desired rate of requests.

4. The system of claim 2 wherein capacity planning is provided by monitoring performance metrics on the server while adjusting the desired rate of requests.

5. The system of claim 1 wherein capacity planning is provided automatically by monitoring performance feedback from the server.

6. The system of claim 5 wherein capacity planning is determined by automatically adjusting the desired rate of requests and comparing the performance feedback to predetermined thresholds.

7. The system of claim 1 further including a data store for holding a plurality of requests.

8. The system of claim 7 further including a queuing mechanism for retrieving and sorting request from the data store.

9. The system of claim 8 further including a queue for storing sorted requests from the queuing mechanism.

10. The system of claim 9 wherein the requests are sorted according to the criteria of time to execute.

11. The system of claim 10 wherein the requests are HTTP requests.

12. The system of claim 9 further including a component for retrieving requests from the queue and sending the request to the server.

13. The system of claim 1 further including a scheduler for determining how many requests to generate for an upcoming period.

14. The system of claim 13 further including a feedback loop for controlling the desired rate of requests.

15. The system of claim 14 wherein the feedback loop determines an error signal that is provided to the scheduler for controlling the desired rate of request.

16. The system of claim 13 wherein the scheduler is activated during a current time period to schedule requests for an upcoming time period.

17. A system for determining capacity of a server, comprising:

means for generating a plurality of requests to the server, said means providing a desired rate of requests by calculating actual rate of requests being generated; and means for adjusting the actual rate to within a predetermined range of the desired rate such that a continual rate of request are provided to the server in order to facilitate determining server capacity.

18. A methodology for generating a continual stream of network requests comprising:

scheduling requests for an upcoming period of time;

sampling actual requests per second;

determining if the actual requests per second are below a target request per second; and increasing the actual requests per second in the upcoming period if the actual requests per second are below the target requests per second.

19. The methodology of claim 18 wherein the step of determining if actual requests per second are below the target requests per second is determined by performing a subtraction.

20. The methodology of claim 18 wherein the actual requests per second are decreased if the actual requests per second are above the target requests per second.

21. The methodology of claim 18 wherein the actual requests per second are maintained if the actual requests per second are equal to the target requests per second.

* * * * *